United States Patent [19]
Liddell

[11] 3,829,202
[45] Aug. 13, 1974

[54] STEREOSCOPIC OPTICAL APPARATUS
[76] Inventor: William S. Liddell, P.O. Box 1533, Avalon, Calif. 90704
[22] Filed: July 20, 1973
[21] Appl. No.: 381,173

Related U.S. Application Data
[63] Continuation-in-part of Ser. No. 168,319, Aug. 2, 1971, abandoned.

[52] U.S. Cl. .................................................. 352/62
[51] Int. Cl. .......................................... G03b 35/02
[58] Field of Search .................... 352/38, 43, 58, 62

[56] References Cited
UNITED STATES PATENTS

| | | | |
|---|---|---|---|
| 2,218,875 | 10/1940 | Parsell | 352/43 |
| 3,225,651 | 12/1965 | Clay | 352/58 X |
| 3,479,111 | 11/1969 | Gabor | 342/44 |

Primary Examiner—Monroe H. Hayes
Attorney, Agent, or Firm—Fulwider, Patton, Rieber, Lee & Utecht

[57] ABSTRACT

Stereoscopic optical apparatus including a composite viewing screen composed of numerous individual optical cells, each of which has a front wall in the form of an image-receiving screen and a back wall in the form of a retina device that is normally opaque but is responsive to invisible index or biasing light to be rendered locally transparent. Disposed behind the image-receiving screen is a viewer lens which focuses light on the retina device. Disposed behind the retina device is a source of image-transmitting light. An index light source in the form of right and left eye biasing light is provided for alternately irradiating the respective right and left sides of the faces of viewers and the retina device is locally responsive to the biasing light to become locally transparent to form pupil areas for passage of image-transmitting light which is then directed to the viewer lens to illuminate a display image appearing on the image-receiving screen and be directed at one or the other of the eyes of respective viewers. Consequently, the right and left eye biasing light may be energized alternately and respective right and left eye display images alternately projected onto the image screen in synchronism with energization of such right and left eye biasing light. Accordingly, when the right eye biasing light is reflected from the right eye of a viewer, it will be projected along a right eye optical path to be focused on a right eye pupil area in the retina to render such pupil area transparent to image-transmitting light to permit passage therethrough of image-transmitting light which will be transmitted in the reverse direction along such optical path to be focused on the right eye of such viewer. Alternately, when the left eye biasing light is energized and the left eye display image is imposed on the cell screen, such left eye biasing light will be reflected from the left eye of the viewer and along a left eye optical path to pass through the viewer lens and be focused on a localized area in the retina device to render such localized area transparent to image-transmitting light to form a pupil area and such image-transmitting light will be projected through the pupil area and in the reverse direction along the left eye optical path to be focused on the left eye of the viewer.

22 Claims, 28 Drawing Figures

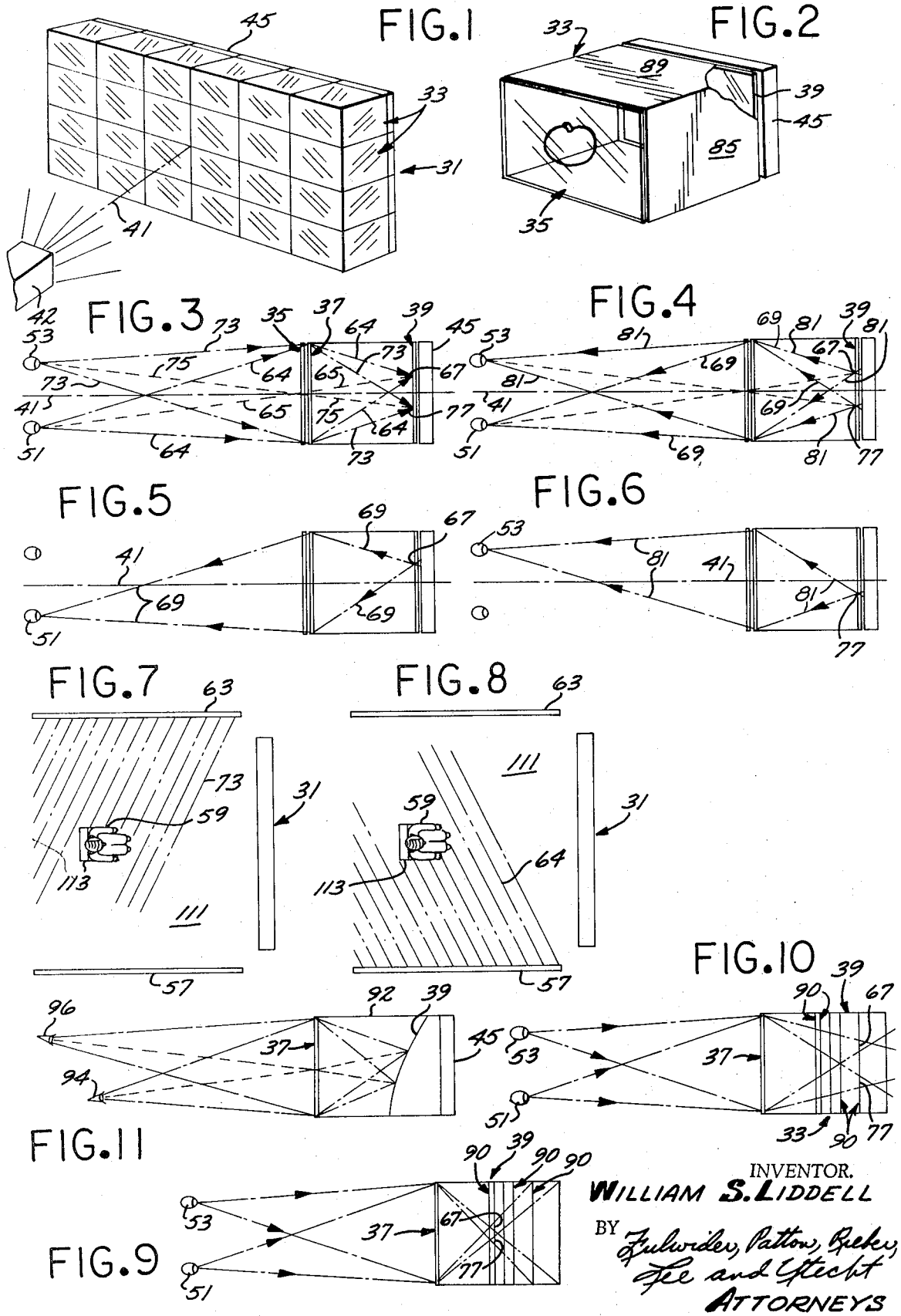

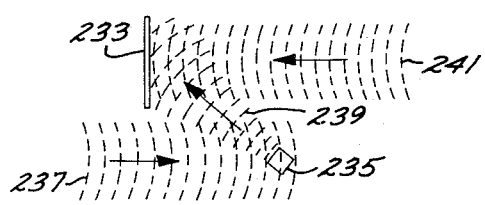
FIG.12
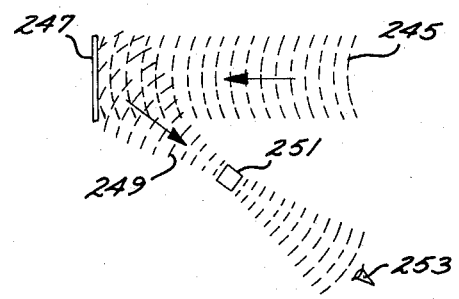
FIG.13
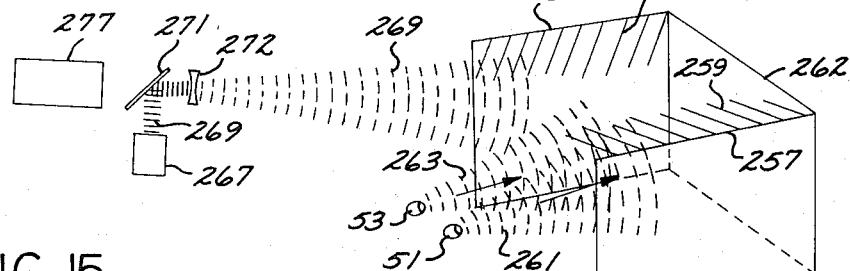
FIG.14
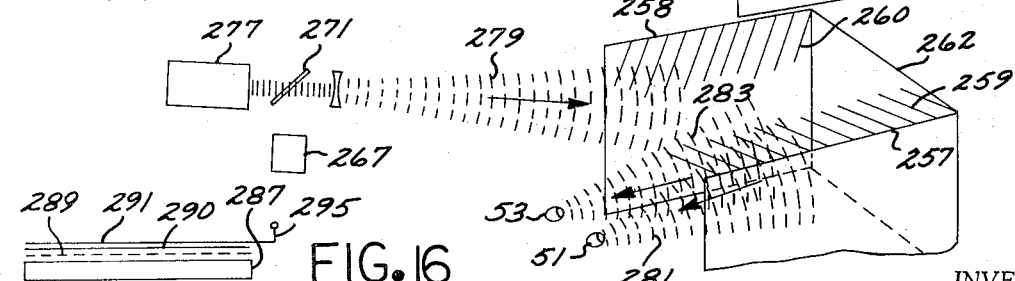
FIG.15
FIG.16
FIG.17
INVENTOR.
WILLIAM S. LIDDELL FIG. 25
FIG. 26
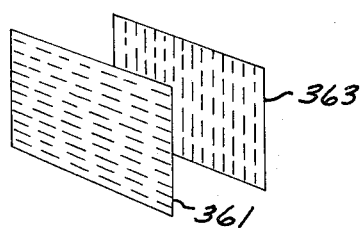
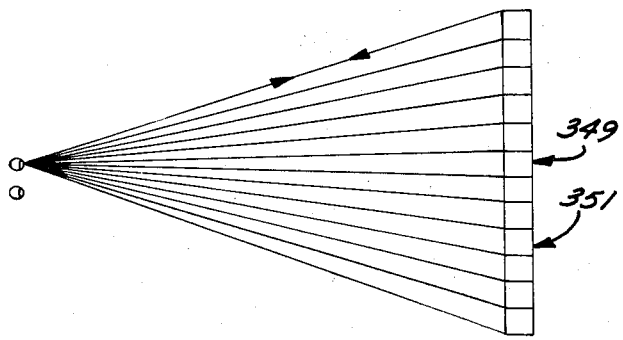
FIG. 27
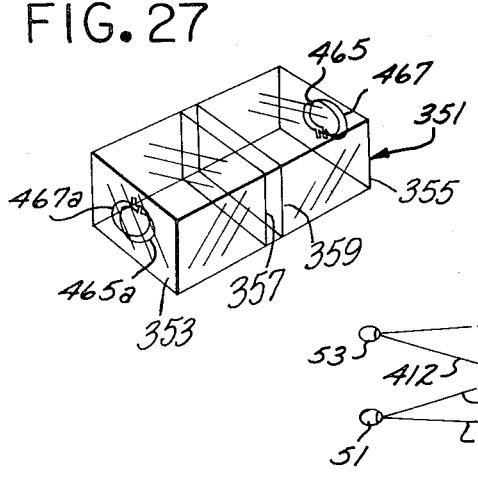
FIG. 28
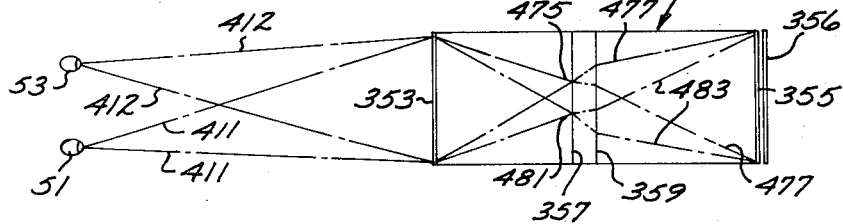
FIG. 24
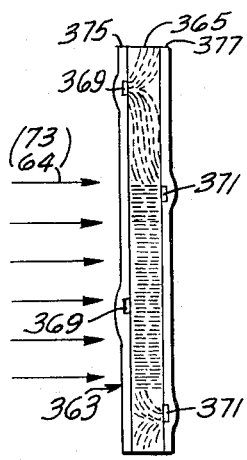
INVENTOR.
WILLIAM S. LIDDELL 3,829,202

STEREOSCOPIC OPTICAL APPARATUS

CROSS REFERENCE TO RELATED APPLICATIONS

This application is a C.I.P. of U.S. application, Ser. No. 168,319, filed Aug. 2, 1971 now abandoned.

BACKGROUND OF THE INVENTION

1. Field of the Invention

The present invention relates to a stereoscopic optical apparatus for displaying three-dimensional images.

2. Description of the Prior Art

It is well known that discrete right and left eye images may be projected onto a flat screen and viewed simultaneously or in rapid succession by the respective right and left eyes of viewers to give an impression of viewing a three-dimensional scene. A number of years ago an effort was made to popularize three-dimensional movies by displaying discrete right and left eye images on a screen in respective vertical and horizontal polarization. The viewers were then provided with polarized glasses which had a right lens that was polarized for transmission therethrough of vertically polarized light and a left lens which was polarized for transmission of horizontally polarized light. Consequently, the right and left eyes of the viewers viewed the respective right and left eye images to give such viewers the impression that they were observing three-dimensional objects. An arrangement of this type is proposed in U.S. Pat. No. 2,218,875. However, this arrangement suffered the shortcoming of requiring all viewers to wear the specially polarized glasses for proper viewing of the movies.

Certain other efforts have been made to selectively project right and left eye images to the respective right and left eyes of viewers as by selectively mechanically blocking the optical path from one or the other eyes of the viewer. A device of this type is shown in U.S. Pat. No. 3,261,977. Devices of this type suffer the shortcoming that the viewer must maintain his head relatively stationary in order for the respective right and left eye images to be focused in his right and left eyes.

Other efforts have led to the proposal of holographic devices such as that shown in U.S. Pat. No. 3,479,111, but such devices suffer the shortcoming that they fail to incorporate dynamic screens which are responsive to viewer movement to continue projecting persuasive three-dimensional images.

SUMMARY OF THE INVENTION

The stereoscopic optical apparatus of present invention is characterized by the provision of biasing light sources for irradiating the audience with biasing light having a wavelength preferably outside the visible spectrum. Biasing light striking the right eye of the viewer is reflected along a right eye optical path to be focused on a right eye pupil area of a retina device to render such pupil area transparent to an image-transmitting light whereby such image-transmitting light will be projected in the reverse direction along such optical path to be focused in the right eye only. Similarly, the biasing light reflected from the left eye of the viewer travels along a left eye optical path to be focused on a left eye pupil area in the retina device to render such left eye pupil area transparent to image-transmitting light for projection in the reverse direction through such pupil area and along such left eye optical path to be focused in the left eye only of the viewer. By projecting right eye display images when the right eye pupil area of the retina is rendered transparent and left eye display images when the left eye pupil area is rendered transparent, the viewer's right and left eyes will view discrete images which may give the impression of viewing three-dimensional scenes.

The objects and advantages of the present invention will become apparent from a consideration of the following detailed description when taken in conjunction with the accompanying drawings.

DESCRIPTION OF THE DRAWINGS

FIG. 1 is a perspective view of a stereoscopic optical apparatus embodying the present invention;

FIG. 2 is a partially broken away perspective view, in enlarged scale, of an optical cell included in the optical apparatus shown in FIG. 1;

FIGS. 3–6 are diagrammatic views of the optical cell shown in FIG. 2;

FIGS. 7 and 8 are schematic views of a viewer viewing the stereoscopic optical apparatus shown in FIG. 1;

FIGS. 9 and 10 are schematic views of the optical cell shown in FIG. 2;

FIG. 11 is a schematic view of a modification of the stereoscopic optical apparatus shown in FIG. 1;

FIGS. 12 and 13 are diagrammatic views of a conventional holographic photographing and projecting device, respectively;

FIGS. 14 and 15 are schematic views of a third embodiment of the stereoscopic optical apparatus of the present invention;

FIGS. 16 and 17 are detailed views of a holographic screen included in the stereoscopic optical apparatus shown in FIGS. 14 and 15;

FIGS. 23 and 24 are vertical transverse sectional views taken through the retina device shown in FIG. 22;

FIG. 25 is a perspective view of a pair of retina devices similar to that shown in FIG. 22 which may be utilized in the stereoscopic optical apparatus shown in FIG. 1;

FIG. 26 is a schematic view of a fifth embodiment of the stereoscopic optical apparatus of the present invention;

FIG. 27 is a perspective view, in enlarged scale, of an optical cell included in the stereoscopic optical apparatus shown in FIG. 26; and FIG. 28 is a diagrammatic view of the optical cell shown in FIG. 26.

Figure 18:
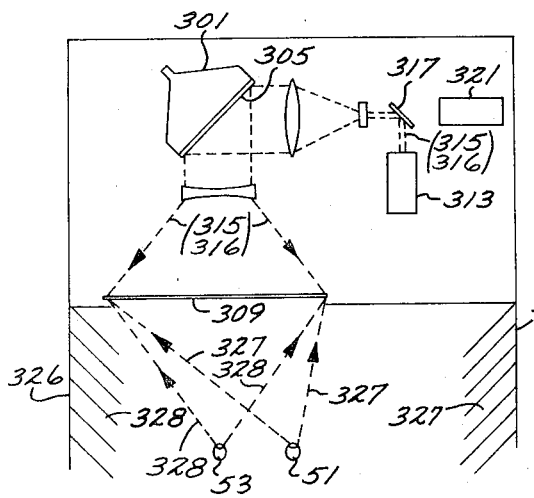
FIGS. 18 and 19 are diagrammatic views of a fourth embodiment of the stereoscopic optical apparatus of the present invention.
Figure 19:
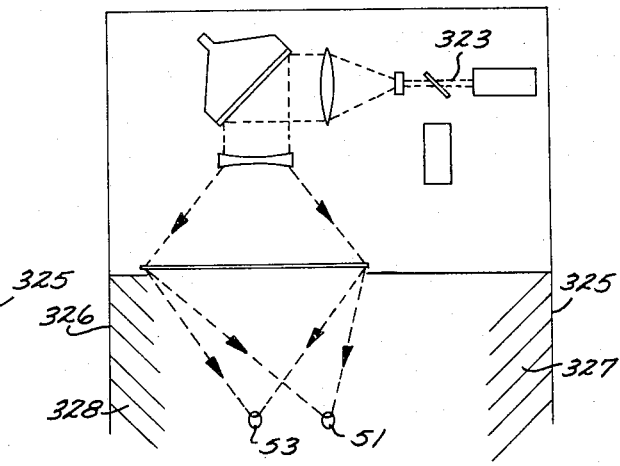

DESCRIPTION OF THE PREFERRED EMBODIMENTS
STEREOSCOPIC OPTICAL APPARATUS SHOWN IN FIGS. 1 – 11, 20 & 21

Referring to FIGS. 1 through 6, the stereoscopic optical apparatus of the present invention includes, generally, a viewing screen assembly 31 made up of a plurality of individual cells 33 with each cell including a front wall formed by an image-receiving screen 35, a viewer lens 37 disposed therebehind and a normally opaque retina device 39, all spaced along an axis 41. A film projector 42 is provided for alternately projecting right and left eye display images onto the front of the screen 31 and an image-transmitting light source 45 is disposed behind the retina devices 39 for projecting light along in the reverse direction along the axes 41 and selectively projecting such light through selected areas of the retinas 39 to illuminate a right or left eye display image registered on such screen to project such image onto the right or left side of a viewer and consequently onto the right or left eye 51 or 53 of such viewer at mutually exclusive times. Referring to FIGS. 7 and 8, an index light device is provided and is in the form of a right eye biasing panel 57 disposed on the right hand side of a viewer 59 and a left eye biasing panel 63 disposed on the left hand side of the viewer 59, such biasing panels being alternately energized to project biasing light alternately at oblique angles on the respective right and left sides of viewers 59.

Figure 20:
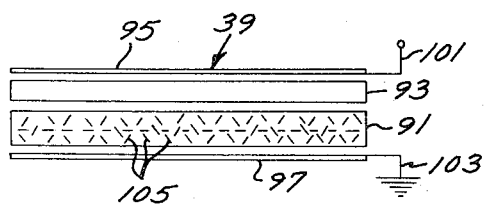
FIGS. 20 and 21 are diagrammatic views of a retina screen included in the stereoscopic optical apparatus shown in FIG. 1.
Figure 21:
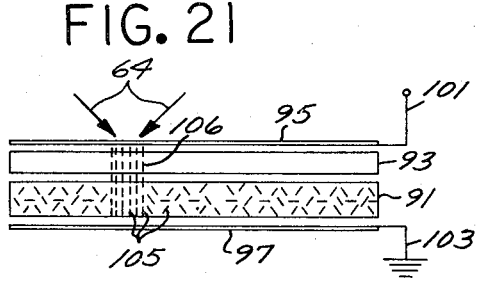
Figure 22:
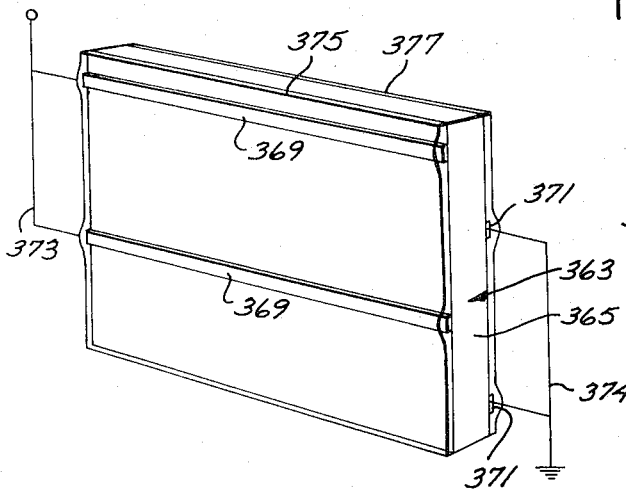
FIG. 22 is a perspective view of a retina device that may be utilized in the stereoscopic optical apparatus shown in FIG. 1.
Figure 23:
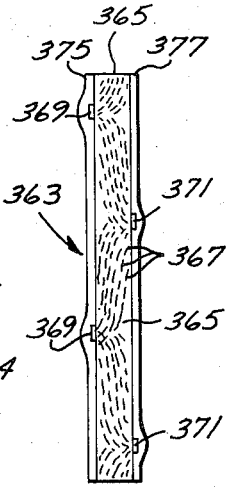

Still referring to FIGS. 3–6, the individual retina devices 39 are similar to the retina screens shown in FIGS. 20 and 21 and are of a nature that they are normally opaque to light projected from the image-transmitting light source 45 and are locally responsive to the biasing light projected on the front side thereof from the respective right and left biasing panels 57 and 63 to be rendered locally transparent to light projected on the back side thereof from the image-transmitting light source 45. Thus, right and left eye display images are alternately projected onto the screen 31 to have segments thereof displayed on the individual cell screens 35 and when the right eye biasing panel is energized, the right side of the viewer's face, including his right eye 51 (FIG. 3), will be irradiated by right-eye biasing light 64, it being realized that as long as the viewer faces forwardly his nose and general facial structure will block the light rays 64 from striking his left eye 53 and being reflected therefrom. Referring to FIG. 3, the light rays 64 striking the right eye 51 will be reflected therefrom along respective right eye optical paths 65 and through the viewer lens 37 to be focused at respective right eye pupil areas 67 on respective retina devices 39 thereby rendering each pupil areas 67 transparent to the image-transmitting light enabling the light rays 69 striking the back side thereof from source 45 (FIG. 4) to be projected through the respective viewer lenses 37 and through the respective image-receiving screens 35 to illuminate the right eye display images registered thereon and to project such images back to the right eye 51. Since the left side of the viewer 59 has not been irradiated by the right eye biasing light 64, there will be no biasing light reflected therefrom and the area of the respective retinas 39 on which the left eye 53 focuses will remain opaque to the image-transmitting light source 45 thereby resulting in such left eye 53 failing to see a display image. It will be appreciated the biasing light reflected from reflective surfaces other than viewer's eyes, such as the sides of the viewer's face, his clothing, pens, buttons and the like, will also open pupil areas 67 resulting in focusing of image transmitting light back on such reflective areas. However, this side effect will not hinder proper operation of the display device.

When the projector 42 projects a left eye display image on the image-receiving screens 35, the right eye biasing panel 57 will be de-energized and the left eye biasing panel 63 energized to transmit left biasing light 73 at an oblique angle towards the left side of the viewer's face thereby resulting in light 73 illuminating the left side of the viewer's face to be reflected from the respective left eyes 53, along respective left eye optical paths 75 (FIG. 3) to be focused at respective left eye pupil areas 77 on the respective retina devices 39 thereby rendering such pupil areas 77 transparent to act as pupils for passage therethrough of image-transmitting light 81 projected from the image light source 45 (FIG. 4). The image-transmitting light 81 will be projected through the respective viewer lenses 37 and through the image-receiving screens 35 to illuminate the left eye display images registered thereon to transmit such images back to the left eye 53, it being realized that the biasing light 73 projected from the panel 63 (FIG. 7) is blocked from the viewer's right eye 51 by his nose and general facial structure and that the focal point on the retina device 39 corresponding with the right eye 51 will remain opaque to the image-transmitting light source 45 thereby resulting in the right eye's failure to have a display image directed thereto. From the foregoing it will be clear that the projector 42 may alternately project right and left eye display images on the image-receiving screen 35 which correspond with the views that would be observed by such right and left eyes in viewing a three-dimensional scene thereby giving the viewer 59 the impression of viewing such a three-dimensional scene.

In the preferred embodiment, the screen assembly 31 is made up of a plurality of individual cells 33 (FIG. 2) which have their front walls in the form of the image-receiving screen 35 with the respective viewer lenses 37 disposed immediately therebehind. The rear walls of the cells 33 are in the form of respective retina devices 39 and the image-transmitting light source 45 is disposed immediately behind such retina device. The side walls 85 and top and bottom walls 89 of the respective cells 33 are in the form of opaque panels to block light propagation from one cell to the other.

The retina device 39 included in the stereoscopic apparatus shown in FIGS. 1–6 is shown schematically as a single wall but may actually be in the form of a plurality of spaced apart plate assemblies, generally designated 90, (FIGS. 9 and 10) with each including a dipole suspension 91 (FIGS. 20 and 21) and a thin homogeneous transparent photoconductive film 93, both of which are sandwiched between transparent electrically conductive films 95 and 97 connected to respective electrical leads 101 and 103. The dipole suspension 91 is of the type described in U.S. Pat. No. 3,512,876 and includes a plurality of needle-like opaque dipolar particles 105 suspended in a random manner in a fluid-like substance contained in the dipole suspension 91. Thus, with the leads 101 and 103 energized by an AC source and the photoconductive film 93 presenting a high resistance to conduction thereof, the opaque dipolar particles 105 will be oriented in a random manner and will block propagation of image-transmitting light 69 and 81 (FIG. 4) from the source 45. However, when biasing light 64 or 73 is focused on localized areas of the photoconductive films 93, such photoconductive films will be operative to locally reduce the electrical resistance thereof to enable the electrical field produced by the energized electrically conductive films 95 and 97 to be transmitted therethrough to form an electrical field across the dipole suspension 91 to cause the opaque dipolar particles 105 to assume parallel alignment with the lines of force of such field as shown in FIG. 29 to thereby permit localized propagation of image-transmitting light 69 or 81.

The image-receiving screens 35 are similar to the retinas 39 except that the photoconductive films 93 included therein are responsive to the magnitude of intensity of light received from the projector 42 to provide for a corresponding degree of electrical field conductivity to provide for a proportionate degree of alignment of the dipolar particles 105 so the areas of the screen 35 receiving a greater intensity of display image light from the projector 42 will align to a greater degree thereby providing for transmission of a greater amount of rear image-transmitting light 69 or 81 than in areas illuminated with projector light of lesser intensity.

Consequently, the stereoscopic optical apparatus shown in FIGS. 1–10 may be utilized by mounting the screen assembly 31 at the front of an auditorium defining an audience area 111 that may have, for example, auditorium seats 133 mounted therein for convenient seating of a number of viewers 59, only one viewer 59 being shown herein for clarity. The projector 42 may be mounted high at the rear of the viewer area 111 and may be energized to project display images from a movie film which has alternate frames of right eye and left eye display images thereon with such images being of the nature that when the images projected therefrom are viewed in rapid succession by the respective right and left eyes 51 and 53 of a viewer, such viewer receives the impression that he is viewing a three-dimensional object.

The right and left biasing light panels 57 and 63 disposed along side the viewers 59 are simultaneously energized in synchronism with the right and left film frames projected from the projector 42 and onto the screen 31. Thus, when the right eye display images are projected onto the respective screens 35, the right eye biasing panel 57 will be energized to project the right eye biasing light 64 into the audience and such light will be reflected from the right sides of the viewers 59 and onto the fronts of the respective cells 33.

Referring to FIG. 3 and considering the biasing light rays 64 reflected from the reflective surface of the right eyes 51 of the viewers 59 it will be appreciated that such rays will be transmitted through the respective viewer lenses 37 to be focused at corresponding pupil areas 67 of the retina devices 39 to reduce the resistance of the photoconductive film 93 to the electrical field set up by the energized electrically conductive film 95 and 97 to thereby cause the electrical field passing through the area of localized reduced resistance of the film 93 to align the opaque dipolar particles 105 with the electrical force lines 106 as shown in FIG. 21 to permit ready passage forwardly therethrough of the image-transmitting light 69 projected from the image-transmitting light source 45 as shown in FIG. 5.

Since the focal points of biasing lights 64 and 73 defining the pupil areas 67 and 77 for viewers 59 sitting closer to the screen 31 are located further from such screen than the corresponding focal points for viewers sitting a greater distance from such screen, the numerous retina plates 90 (FIGS. 9 and 10) are provided and since the pupil areas 67 and 77 focusing closer to the screen (FIG. 9) are spaced closer to one another in the transverse direction than those spaced farther from the screen (FIG. 10), the plates located closer to the screen are more closely spaced than those located further away. Thus, the biasing lights 64 and 73 projected into the respective cells 33 essentially aligns all the dipolar particles 105 in the entire conical volume defined by the rays 64 or 73 converging behind the viewer lens 37. Consequently, the retina plate 90 located closest to the focal points of rays 64 and 73 actually have the smallest areas therein rendered transparent to the image-transmitting light 69 and 81, thereby defining the respective pupil areas 67 and 77.

The image-transmitting light 69 projected through from the source 45 and through the right eye pupil area 77 will be projected through the respective individual viewer lenses 37 to be directed through the respective image-receiving screens 35 emerging at intensities determined by the right eye display image projected thereon by the projector 42. Such image-transmitting light 69 from the respective cells 33 will then be focused in the right eye 51 of the viewer 50 to provide a composite display image composed of the total light projected from all such cells. Since, at this point in time the left eye pupil area 67 remains opaque, the left eye 53 sees nothing.

As described hereinabove, the intensity of the image-transmitting light transmitted through the respective screens 35 is determined by the intensity of the light projected thereon by the projector 42 and the consequent degree of alignment of the dipolar particles 105 in such screens to thereby provide a variation in light intensity across the face of the entire screen 31 that is dictated by the image projected thereon.

In the preferred embodiment, light radiated from the image-transmitting light source 45 is intermittent, as for example stroboscopic and the dipolar particles 105 in the screens 35, once aligned, are relatively slow to return to their random orientation so that AC may be applied to screen 35 while the image-transmitting light source 45 is de-energized thereby allowing the projector 42 to register a display image on the respective screens, and the AC applied to such screens may then be discontinued while the image-transmitting light source 45 is energized and the display image will linger during projection thereof to the viewer 59. In this manner, image-transmitting light illuminates the display image on screens 35 while in no way altering the alignments of dipolar particles 105.

Immediately after display of the right eye film frame, a left eye film frame will follow and be projected through the individual lens of the projector 42 to have a left eye display image projected on the screen 31 and on the respective front surfaces of the respective image-receiving screens 35. Simultaneously, the right eye biasing panel 57 will be de-energized and the left eye biasing panel 63 will be energized to project left eye invisible biasing light 73 at an oblique angle into the audience area 111. The biasing light 73 striking the left side of the viewer 59 will be reflected to the screen assembly 31. Biasing light 73 reflected from the area of the left eye 53 will project along the respective left eye optical paths 75 to pass through the respective viewer lenses 37 to be focused at the left eye pupil areas 77 of the respective retina devices 39. As described hereinabove, the biasing light 73 focused on the photoconductive film 93 will render such photoconductive film locally electrically conductive to permit passage therethrough of the electrical field between the energized electrically conductive films 95 and 97 to cause the ferromagnetic opaque dipolar particles 105 to align in the transverse direction to discontinue blocking of light from the image-transmitting light source 45 to permit the source light 81 to pass through the pupil area 77 and be projected through the viewer lens 37 and image-receiving acreen 35 to a degree determined by the intensity of the projector light projected onto the respective screens. The light 81 projected through the respective screens 35 will be focused on the left eye 53 thereby enabling the viewer to view the left eye display image appearing on the screen 35.

It will be appreciated that the relatively minute cells 33 making up the screen assembly 31 each receive a portion of the overall display image projected from the projector 42 and when the entire image on the screen 31 is viewed by the viewer 59, he receives the impression of viewing a single composite continuous picture displayed over the entire screen assembly 31.

The optical cell 92 shown in FIG. 11 demonstrates another method for compensating for the different locations of viewers by providing a retina 39 which can be conformed to particular curvatures to accommodate the arrangement of the particular audience viewing the screen 31. With the particular curvatures shown, the eye 96 of the viewer located further away focuses relatively close to the viewer lens 37 but right at the surface of the retina 39 while the eye 94 of a viewer located closer to the lens 37 focuses a greater distance behind such lens but also at the surface of the retina 39.

A modification of the present invention incorporates retinas 39 that are responsive to the right eye biasing light 64 of a first wavelength to become vertically polarized for projection therethrough of vertically polarized light to illuminate right eye display images registered in vertical polarization on the screens 35, and responsive to the left eye biasing light 73 of a second, different wavelength to become horizontally polarized for projection therethrough of horizontally polarized light to illuminate left eye display images registered simultaneously in horizontal polarization on the screens 35.

HOLOGRAPHIC STEREOSCOPIC OPTICAL APPARATUS SHOWN IN FIGS. 12-17

The stereoscopic apparatus shown in FIGS. 14 and 15 incorporates a variable image reflective holographic screen, generally designated 262, which is optically responsive to specific light reflected thereto from areas of a viewer's face to focus a display image appearing on such screen directly back onto such areas of a viewer's face.

The construction and operation of holograms is well known in the art for use in recording three-dimensional objects. Referring to FIGS. 12 and 13, a conventional holographic film 233 may be used to record a three-dimensional object 235 by irradiating such object with a laser beam 237 to cause light to be reflected from such object along a light beam 239 leading to the holographic film 233. The film 233 is also irradiated with a reference laser beam 241 of the same wavelength as beam 237 and the light waves of the beams 239 and 241 interfere with one another at the surface of the holographic film 233 in accordance with the three-dimensional shape of the object 235.

The exposed film 233 may then be developed to produce a hologram which may be irradiated with a reference laser beam 245 (FIG. 13) and the light of such beam will be reflected from the hologram 247 in accordance with the recorded interference pattern of the object 235 to be projected along a wave front 249 to produce a real image 251 which may be viewed by an observer's eye 253.

The holographic system shown in FIGS. 14-17 includes a pair of parallel biasing light projector panels 257 and 258 disposed on opposite sides of a holographic screen 262 for projecting right and left eye biasing laser light 259 and 260 onto the respective right and left sides of the faces of viewers. The biasing light 259 and 260 reflected from the areas of the respective eyes 51 and 53 travels along optical paths 261 and 263 to be projected onto the front surface of the holographic screen 262. Right and left eye biasing lights 259 and 260 bear the same wavelength which is preferably outside the visible spectrum.

A reference light projector 267 is provided for projecting a reference beam of laser light 269 onto a 45 degree mirror 271 which reflects such beam through a lens 272 and onto the front surface of the holographic screen 262. Reference beam 269 bears the same wavelength as right and left eye biasing lights 259 and 260.

Referring to FIG. 15, simultaneous with the above-described projection, an image projector 277 alternately projects right and left eye display images along an optical path 279 and through the mirror 271 which is transparent to visible light and through the lens 272 to the front surface of the holographic screen 262.

Referring to FIGS. 16 and 17, the variable image holographic screen 262 is similar to the fixed image screen shown in U.S. Pat. No. 3,479,111 but is made of an electrically conductive distortable or deformable suspension sheet 287 having a photoconductive film 290 on one side thereof and undercoated by a reflective film 289 which reflects image projector light 279. Sheet 287, film 289 and film 290 are sandwiched between electrically conductive transparent films 291 and 293 connected to respective energized and ground electrical leads 295 and 297, the ground lead 297 including a voltage drop resistor 298. Normally, reflective film 298 and suspension sheet 287 are flat due to the uniform electrical attraction from voltage maintained between conductive films 295 and 297 by photoconductive film 290 in a state of high electrical resistance. However, at areas on the holographic screen 262 where right eye light beam 261 and reference beam 269 interfere constructively (i.e. where light energy is added), light exposes photoconductive film 290 causing such film to reduce its local electrical resistance. Thus, at such areas, voltage and electrical attraction between conductive films 291 and 293 are reduced resulting in a local relaxation of compression on suspension sheet 287. This results in tiny local rises 299 in the reflective film 289 at areas of exposure to light.

The variable image holographic screen 262 is therefore constructed to respond to the interference pattern of the right eye light beam 261 and reference beam 269 to form tiny segments 299 of the reflective film 290 to reflect the right eye display image light from the holographic screen 262 and along a right optical path 281 as shown in FIG. 15 to be directed to the right eye 51 only. Correspondingly, the left eye biasing light beam 263 and the reference light 269 cooperate to form an interference pattern which will cause the reflective film 290 to reflect the left eye display image light along the left eye optical path 283 to the left eye 53 only.

In operation, the right and left eye biasing light panels 257 and 258 are energized alternately and in synchronism with projection of the right and left eye display images from the projector 277. Thus, when the right eye display image is projected onto the holographic screen 262, the right eye biasing panel 257 will be energized to project right eye biasing light 250 onto the area of the right eye 51 where it will be reflected along the optical path 261 to interfere with the reference light beam 269 from the reference light projector 267 and cooperate therewith in altering the conductivity of the photoconductive film 290 to expand and contract the suspension sheet 287 to form slight rises 299 (FIG. 17) and corresponding depressions which deform the reflective film 298 to cause small segments of such films to form an angled reflective surface that directs the right eye display image light along the optical axis 281 (FIG. 15) to the right eye 51. Alternately when the image projector 277 projects a left eye display image on the screen 262, the left eye biasing panel 285 will be energized to direct left eye biasing light 260 onto the area of the left eye 53 of the viewer from where it will be reflected along a left eye optical path 263 to interfere with the reference beam 269 and shape the reflective film 290 to cause the left eye display image to be reflected along the optical path 283 (FIG. 15) and into the left eye 53 only.

Another embodiment of the stereoscopic optical apparatus of the present invention incorporates a holographic screen 262 that is made up of small interspersed areas covered by vertically and horizontally polarized film which simultaneously direct vertically polarized right eye display images and horizontally polarized left eye display images to the respective right and left eyes 51 and 53.

DESCRIPTION OF STEREOSCOPIC TELEVISION APPARATUS SHOWN IN FIGS. 18 AND 19

The stereoscopic television optical apparatus shown in FIG. 18 is similar to that shown in FIGS. 14 and 15 and includes a television tube 301 providing both right and left eye display images and having an image-receiving conversion sheet 305 mounted on the front thereof. The conversion sheet 305 is similar to the image-receiving screen 35 except an electrically conductive plane mirror is included between dipole suspension 91 and photoconductive film 93 (FIGS. 20 and 21). The conversion sheet 305 registers right eye display images in vertical polarization and left eye display images in horizontal polarization (by means of a selection film described hereinafter in connection with hologram 309). Mounted in front of the television tube 301 is a variable image refractive hologram 309 which is similar in construction to the variable image reflective holographic screen 262 except the reflective film is omitted, all films and layers composing the hologram are transparent and, in addition, the electrically conductive distortable suspension sheet is optically refractive. The hologram 309 is made of interspersed minute segments of a first set responsive to a biasing light of one wavelength and of a second set that is responsive to a biasing light of a second wavelength. Such hologram 309 is covered with a selection film including a first set of vertically polarized areas overlying the first set of for transmitting vertically polarized light and a second set of horizontally polarized areas overlying such second set of areas for transmitting horizontally polarized light. A reference light projector 313 is provided for projecting invisible right eye reference light 315 of a first wavelength and invisible left eye reference light 316 of a second wavelength into a 45 degree mirror 317 and through a lens system to the front of the television tube 301 to be protected as reference beams onto the refractive variable image hologram 309. An image-transmitting light source 321 is provided for projecting image-transmitting light 323 through the mirror 317, such mirror being transparent to visible light, and to the conversion sheet 305 to be directed to the hologram 309. Biasing light panels 325 and 326 are mounted on opposite sides of the viewing area for projecting respective bias light 327 and 328 of first and second wavelengths onto the respective right and left eyes 51 and 53. Reference light 315 bears the same wavelength as biasing light 327 and reference light 316 bears the same wavelength as biasing light 328.

Consequently, in operation the right and left eye television display images may be produced on the image-receiving screen 305 with the reference light projector 313 energized, the biasing light panels 325 and 326 energized, and the image-transmitting light source 321 energized. The right eye reference light 315 will be directed as a reference beam to the refractive hologram 309 and the right eye beam 327 will be reflected from the area of the right eye 51 of the viewer to cooperate with the invisible right eye reference light 315 at the surface of the hologram 309 to render the areas of such hologram responsive to such light operative to direct vertically polarized image-transmitting light 323 at the viewer's right eye 51. Simultaneously, the left eye biasing light 328 is reflected from the area of the left eye 53 of the viewer and will cooperate with the left eye reference light 316 at the surface of the hologram 309 to direct the horizontally polarized left eye images to the left eye 53 of the viewer.

REAR PROJECTION STEREOSCOPIC OPTICAL APPARATUS SHOWN IN FIGS. 22-27

The stereoscopic optical system shown in FIGS. 22-27 is similar to the system shown in FIGS. 1-6 except that it is of a rear projection type and provides for simultaneous projection of right and left eye display images. Referring to FIGS. 26 and 27, the subject system includes, in general, individual cells 351 together composing a screen such as screen 31 in FIG. 1 and including a front wall in the form of a viewer lens 353 similar to the viewer lens 37 and a back wall in the form of an object screen 355 having an image-transmitting light source 356 therebehind. The cell 351 includes a pair of intermediate transverse partitions, one of such partitions forming a retina 357 similar to the retina 39 and the other partition forming an image lens 359, such image lens being spaced preferably at a distance of twice its own focal length from both viewer lens 353 and object screen 355. With an unobstructed light path, display images presented on object screen 355 will be focused by image lens 359 into the plane of viewer lens 353 (FIG. 26). Such focused images will have unit magnification, and upside down orientation, with respect to their counterpart images on object screen 355.

For simultaneous projection of right and left eye display images, the retina 357 is constructed to provide for selective projection therethrough of vertically and horizontally polarized light to the right and left eyes 51 and 53, respectively.

Referring to FIGS. 22–27, the retina 357 includes overlying vertically and horizontally polarized dipolar sheets 363 and 361, respectively. The dipolar sheets 361 and 363 are similarly constructed and the vertically polarizing sheet 363 (FIG. 22) includes a dipole suspension 365 containing randomly oriented opaque dipolar particles 367 suspended therebetween in a liquid film. Such dipole suspension may be of the type disclosed in U.S. Pat. No. 3,512,876.

Spaced at equidistant points across one side of the dipole suspension 365 are horizontally extending positive conductors 369 and disposed on the opposite side of such dipole suspension 365 at points intermediate the location of the positive conductors 369 are horizontally extending negative conductors 371. The positive conductors 369 are connected together at their ends by means of a lead 373 leading to an electrical source. The common ends of the negative conductors 371 may be connected to ground by means of a common ground lead 374. Thus, under normal circumstances, the positive and negative conductors 369 and 371 create an electrical field resulting in alignment of the opaque dipolar particles 367 in a generally vertical orientation to thus cause sheet 363 to act as a vertical polarizer.

It will be appreciated that the electrical source energizing leads 373 and 374 may be an AC source allowing conductors 369 and 371 to alternate in polarities while still maintaining electrical fields therebetween.

Overlying opposite sides of the dipole suspension 365 are photoconductive films 375 and 377 which normally act as electrical insulators but which are responsive to left eye biasing light 73 reflected from the left eye 53 of viewers to be rendered locally conductive. At areas of photoconductive films 375 and 377 exposed to left eye biasing light 73 (FIG. 24), electrical charge is drawn, respectively, from local conductors 369 and 371 onto such exposed areas of films 375 and 377. Therefore, a uniform electrical field is created between exposed areas of photoconductive films 375 and 377 resulting in the local alignment of dipolar particles 367 therebetween in a transverse direction to thus permit light of all polarizations to transmit through sheet 363 at such areas.

The horizontal polarizing sheet 361 is similarly constructed except thatit is arranged to cause the dipolar particles 367 to normally assume a horizontal orientation for horizontal polarization of light projected therethrough and is responsive to right eye biasing light 64 to cause the particles 367 to align in a transverse direction to permit light of all polarizations to transmit therethrough.

As hereinabove described, retina 357 is a lamination of vertically and horizontally polarizing sheets 363 and 361, respectively. Therefore, under normal circumstances, such sheets act as crossed polarizers to block transmission of all light. However, at areas irradiated by right eye biasing light 64, sheet 361 is responsive to pass light of all polarizations while sheet 363 remains a vertical polarizer. Then only vertically polarized light can pass through areas of retina 357 exposed to right eye biasing light 64.

Correspondingly, at areas irradiated by left eye biasing light 73, sheet 363 is responsive to pass light of all polarizations while sheet 361 remains a horizontal polarizer. At areas of retina 357 exposed to left eye biasing light 73, then, only horizontally polarized light can pass.

For the system shown in FIG. 26, the biasing panels 57 and 63 shown in FIGS. 7 and 8 radiate biasing light of first and second wavelengths for selectively actuating the retinas 357.

In operation, vertically polarized right eye display images and horizontally polarized left eye display images are projected onto the back side of the screen assembly composed of optical cells 351 to produce miniscule image segments such as those represented by the symbols 465 and 467 depicted on the object screen 355 of the optical cell 351 shown in FIG. 26. Biasing light panels 57 and 63 are then actuated to simultaneously project right and left biasing lights 64 and 73 onto the respective right and left sides of the viewers 59 to illuminate the respective right and left eyes 51 and 53, respectively, of such viewers with the respective biasing light.

The right eye biasing light 411 will be reflected from areas of the right eyes 53 and through the viewer lens 353 of the screen optical cells 351 (FIG. 27) to be focused on the respective retinas 357 to form pupil areas 475 which are transparent to the vertically polarized light 477 projected from the vertically polarized right eye display images 465 on the image-receiving screen 355. Similarly, the left eye biasing light 73 will be directed at the areas of the respective left eyes 51 of viewers and will be reflected therefrom as shown in FIG. 27 to be projected through the viewer lens 353 of the respective screen cells 351 to be focused on the respective retinas 357 to form respective left eye pupil areas 481 which are rendered transparent to horizontally polarized light 483 projected from the horizontally polarized left eye display images 467 disposed on the image-receiving screen 355. Consequently, the right eyes 51 will see only right eye display images 465 in the form of images 465a which appear to be in the plane of the viewer lens 353 and left eyes 53 will see only left eye display images 467 which also appear to be images 467a disposed in the plane of such viewer lens 353.

From the foregoing it will be apparent that the stereoscopic optical apparatus of the present invention provides an economical and convenient means for projecting three-dimensional images while permitting the viewer relatively high degree of freedom in movement about the viewing area and freeing him of the necessity of wearing polarized lenses and the like.

Various modifications and changes may be made with regard to the foregoing detailed description without departing from the spirit of the invention.

I claim:

1. Stereoscopic optical apparatus comprising:
image-receiving screen means disposed in an optical axis;
retina means disposed in said optical axis, said retina means being normally opaque to visible light and being responsive to biasing light means to be rendered locally transmissive to visible light;

viewer lens means for focusing light at different points on said retina means;

index light means for projecting indexing light onto the right and left eyes of a viewer for reflection from the reflective surfaces thereof to be projected along respective right and left eye optical paths and through said lens means to be focused on respective right and left areas of said retina means to render said areas transmissive to define respective right and left pupil areas; and image light projecting means for projecting right and left eye image-transmitting light through said respective right and left pupil areas whereby a right eye image will be transmitted to said right eye and a left eye image will be transmitted to said left eye.

2. Stereoscopic optical apparatus as set forth in claim 1 wherein:

said index light means includes right and left eye biasing means for alternately projecting right and left eye biasing light to said respective right and left eyes; and said projector means includes means for alternately projecting right and left eye image-transmitting light through said respective right and left pupil areas when said respective right and left eye biasing means are projecting said respective right and left eye biasing light.

3. Stereoscopic optical apparatus as set forth in claim 1 wherein:

said screen means includes a variable image transparency responsive to the intensity of light throughout an image projected thereon to be rendered thansmissive in proportion to the image light intensity; and said projector means includes means for projecting an image onto said transparency whereby said image-transmitting light will be transmitted through said transparency in proportion to the intensity of light forming said image.

4. Stereoscopic optical apparatus as set forth in claim 1 that includes:

a plurality of individual cells, each formed with said image-receiving screen, retina means and viewer lens means.

5. Stereoscopic optical apparatus as set forth in claim 1 wherein:

said image-receiving screen is disposed at one end of a viewer area; and said indexing light means includes a first biasing light source disposed on one side of said viewer area for irradiating the left eyes of viewers disposed in said viewer area with left eye biasing light and second biasing light source disposed opposite said first biasing light source for irradiating the light eyes of said viewers with right eye biasing light.

6. Stereoscopic optical apparatus as set forth in claim 1 wherein:

said screen means is disposed on one side of said retina means and said image projecting means is disposed on the opposite side thereof.

7. Stereoscopic optical apparatus as set forth in claim 1 wherein:

said image light projecting means is disposed on one side of said retina means; and said image-receiving screen is disposed intermediate said image light projecting means and said retina means and is responsive to the intensity of image projected thereon throughout its area to be rendered correspondingly transmissive to image-transmitting light.

8. Stereoscopic optical apparatus as set forth in claim 1 that includes:

retina lens means interposed between said retina means and said image-receiving screen means.

9. Stereoscopic optical apparatus as set forth in claim 1 wherein:

said retina means includes first and second overlying sheets of dipole suspensions, first and second sets of elongated electrical conductors disposed on opposite sides of said respective sheets, the respective conduits of the respective one set being interposed between the respective conductors of the respective second set and the conductors on the opposite sides of the first dipole suspension projecting perpendicular to the conductors disposed on the opposite sides of the second dipole suspension, said retina means further including electrical means for applying opposite polarities of electricity to said respective first and second sets and photoconductive films coating opposite sides of said dipole suspensions and disposed in electrical conductive relationship with the conductors on the adjacent sides of said suspensions; and said image light projecting means includes means for projecting right and left eye display images of substantially opposite polarizations.

10. Stereoscopic optical apparatus as set forth in claim 1 wherein:

said retina means includes compensating means for disposing said left and right pupil areas at different distances from said viewer lens means to compensate for viewers located at different distances from said lens means.

11. Stereoscopic optical apparatus as set forth in claim 1 wherein:

said retina means is interposed between said screen means and viewer leans means and said apparatus includes:

retina lens means interposed between said retina means and said image-receiving screen means.

12. Stereoscopic optical apparatus as set forth in claim 1 wherein:

said retina means includes ferro-magnetic light control particles shiftable between light blocking positions and light-transmitting positions and photoelectric means responsive to said index light to shift said particles from said light blocking positions to said light-transmitting positions.

13. Stereoscopic optical apparatus as set forth in claim 1 wherein:

said retina means includes a plurality of retina plates spaced at different distances from said lens means and each being responsive to said index light to be rendered transparent to said image-transmitting light.

14. Stereoscopic optical apparatus as set forth in claim 1 wherein said retina means includes:

right and left eye retina plate means, each plate means including transparent dipolar suspension plate means including light reflective elongated dipolar particles arranged to normally assume random orientation for blocking projection of image-transmitting light through said retina plate means, oppositely polarized sets of coextensive elongated electrical conductors disposed on opposite sides of said respective suspension plate means, the conductors for said right and left retina plate means being arranged to, upon energization of said conductors of said respective retina plate means, causing said particles to align for transmission of image-transmitting light of respective first and second polarizations;

first and second photoconductive means overlying said right and left retina plate means and responsive to index light reflected from the respective right and left sides of viewers to be rendered electrically conductive to orient said dipolar particles in said respective left and right suspension plate means for transmitting light of said respective second and first polarizations; and said image light projector means projects right and left image-transmitting light of said respective first and second polarizations.

15. Stereoscopic optical apparatus as set forth in claim 1 for displaying to viewers spaced different distances therefrom and wherein:

said retina means includes a plurality of coextensive retina plates spaced one behind the other at distances proportional to the distances said viewers are spaced from said apparatus and each being operative in response to said index light to be rendered locally transparent to said image-transmitting light.

16. Stereoscopic optical apparatus as set forth in claim 1 that includes:

projector means for projecting right and left eye image light of respective first and second characters on said image-receiving screen;

said indexing light means includes first and second bias light means for projecting first and second bias light on said right and left pupil areas; and said retina means is responsive to said first and second bias lights to transmit image-transmitting light of said respective first and second characters to said respective right and left eyes.

17. Stereoscopic optical apparatus as set forth in claim 16 wherein:

said projector means includes means for projecting right and left eye images of first and second polarizations; and said retina means is responsive to said first and second bias means to transmit image-transmitting of first and second polarizations.

18. Stereoscopic optical apparatus comprising:

image-receiving screen means disposed in an optical axis;

projecting means for projecting right and left image-transmitting light from said screen means;

index light means for projecting right and left index light into the right and left eyes of a viewer for being reflected from the reflective surfaces thereof and along respective right and left optical paths and onto said screen means; and optical means in said screen means and responsive to said right and left index light and the angle of said right and left optical paths to direct said right and left image-transmitting light to said respective right and left eyes.

19. Stereoscopic optical apparatus as set forth in claim 18 wherein:

said index light means includes a reference light projector for projecting reference light at said screen means and right and left eye audience light projectors for projecting said right and left eye audience light into said respective right and left eyes of said viewer for reflection therefrom and toward said screen means to cooperate with said reference light to form an interference pattern; and said screen means includes holographic screen means responsive to said interference pattern between said reference light and right and left eye audience light for controlling said optical means.

20. Stereoscopic optical apparatus as set forth in claim 18 wherein:

said optical means includes retina means disposed in said optical axis and normally opaque to said image-transmitting light, said retina means being responsive to said index light to be rendered locally transparent to said image-transmitting light and lens means disposed in said optical axis for focusing the index light reflected from said respective eyes at different areas on said retina means to render said areas transparent to said image-transmitting light to form respective right and left retina pupil areas for projection therethrough of said respective right and left eye image-transmitting light.

21. Stereoscopic optical apparatus as set forth in claim 18 wherein:

said index light means includes right and left bias light means for being intermittently energized to alternately irradiate the right and left eyes of said viewer with respective right and left eye bias light; and said projecting means includes means for alternately projecting right and left eye images in synchronism with energization of said right and left bias means.

22. Stereoscopic optical apparatus as set forth in claim 18 wherein:

said screen means is responsive to light of first and second characters to project image-transmitting light of first and second natures to said eyes;

said index light means includes means for projecting index light of said first and second characters into said respective right and left eyes for reflection along said respective right and left optical paths; and said projecting means includes means for projecting right and left eye image-transmitting light of said first and second natures whereby said right and left eye image-transmitting light may be projected to said respective right and left eyes simultaneously.

* * * * *